(12) United States Patent
Tomita (10) Patent No.: US 6,915,222 B2
(45) Date of Patent: Jul. 5, 2005

(54) SEMICONDUCTOR INTEGRATED CIRCUIT INCLUDING WAVEFORM-GENERATING CIRCUIT HAVING PULSED WAVEFORM-GENERATING FUNCTION

(75) Inventor: Seiichi Tomita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 69 days.

(21) Appl. No.: 10/606,804

(22) Filed: Jun. 27, 2003

(65) Prior Publication Data

US 2004/0051577 A1 Mar. 18, 2004

(30) Foreign Application Priority Data

Jun. 28, 2002 (JP) .................................... 2002-189665

(51) Int. Cl.$^7$ ............................................. G06F 00/04
(52) U.S. Cl. ...................................................... 702/66
(58) Field of Search ........................... 702/66; 398/185; 315/382; 381/63; 327/131, 172; 360/8; 324/310; 363/26, 41, 56; 330/10; 361/94; 257/10; 331/57; 607/48; 219/124; 368/21

(56) References Cited

U.S. PATENT DOCUMENTS 3,793,635 A * 2/1974 Potter .......................... 342/463
5,223,656 A * 6/1993 Higashi ........................ 84/661
5,515,258 A    5/1996 Viertler
5,930,132 A    7/1999 Watanabe et al.

* cited by examiner

Primary Examiner—John Barlow
Assistant Examiner—Tung S Lau
(74) Attorney, Agent, or Firm—Oblon, Spivak, McClelland, Maier & Neustadt, P.C.

(57) ABSTRACT

A semiconductor integrated circuit according to an aspect of the invention comprises a first storage circuit, second storage circuit, adder circuit, timer, first comparator circuit and waveform-generating circuit. The first storage circuit stores a first value used to set a dead time. The second storage circuit stores a second value used to set a pulse width. The adder circuit adds the first value stored in the first storage circuit and the second value stored in the second storage circuit, thereby outputting an addition result. The timer measures an elapsed time and outputs a count value indicative of the elapsed time. The first comparator circuit compares the count value output from the timer with the addition result output from the adder circuit. The waveform-generating circuit generates a pulse on the basis of a comparison result of the first comparator circuit.

11 Claims, 8 Drawing Sheets

SEMICONDUCTOR INTEGRATED CIRCUIT INCLUDING WAVEFORM-GENERATING CIRCUIT HAVING PULSED WAVEFORM-GENERATING FUNCTION

CROSS-REFERENCE TO RELATED APPLICATIONS

This application is based upon and claims the benefit of priority from the prior Japanese Patent Application No. 2002-189665, filed Jun. 28, 2002, the entire contents of which are incorporated herein by reference.

BACKGROUND OF THE INVENTION

1. Field of the Invention

The present invention relates to a semiconductor integrated circuit, and more particularly to a waveform-generating circuit device having a pulsed waveform-generating function and capable of varying a dead time or duty ratio.

2. Description of the Related Art

Figure 1:
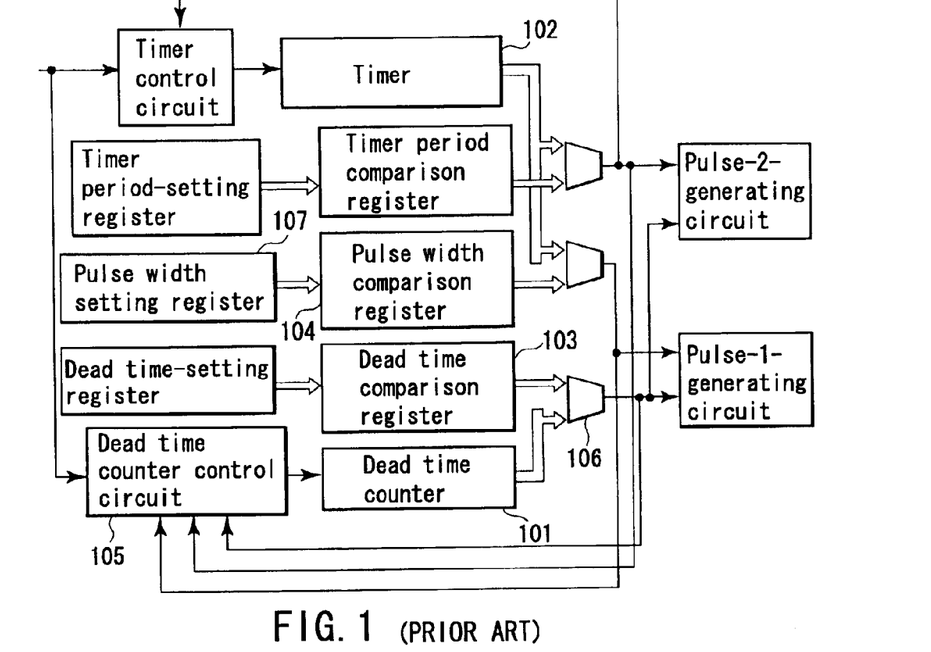
FIG. 1 is a block diagram illustrating the structure of a conventional waveform-generating circuit device.
Figure 2:
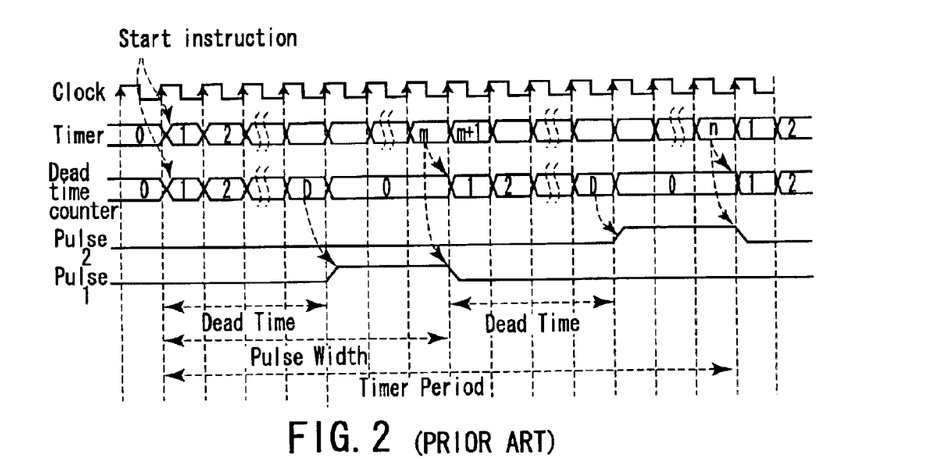
FIG. 2 is a timing chart useful in explaining examples of waveforms having respective dead time portions generated by the conventional waveform-generating circuit device.
Figure 3:
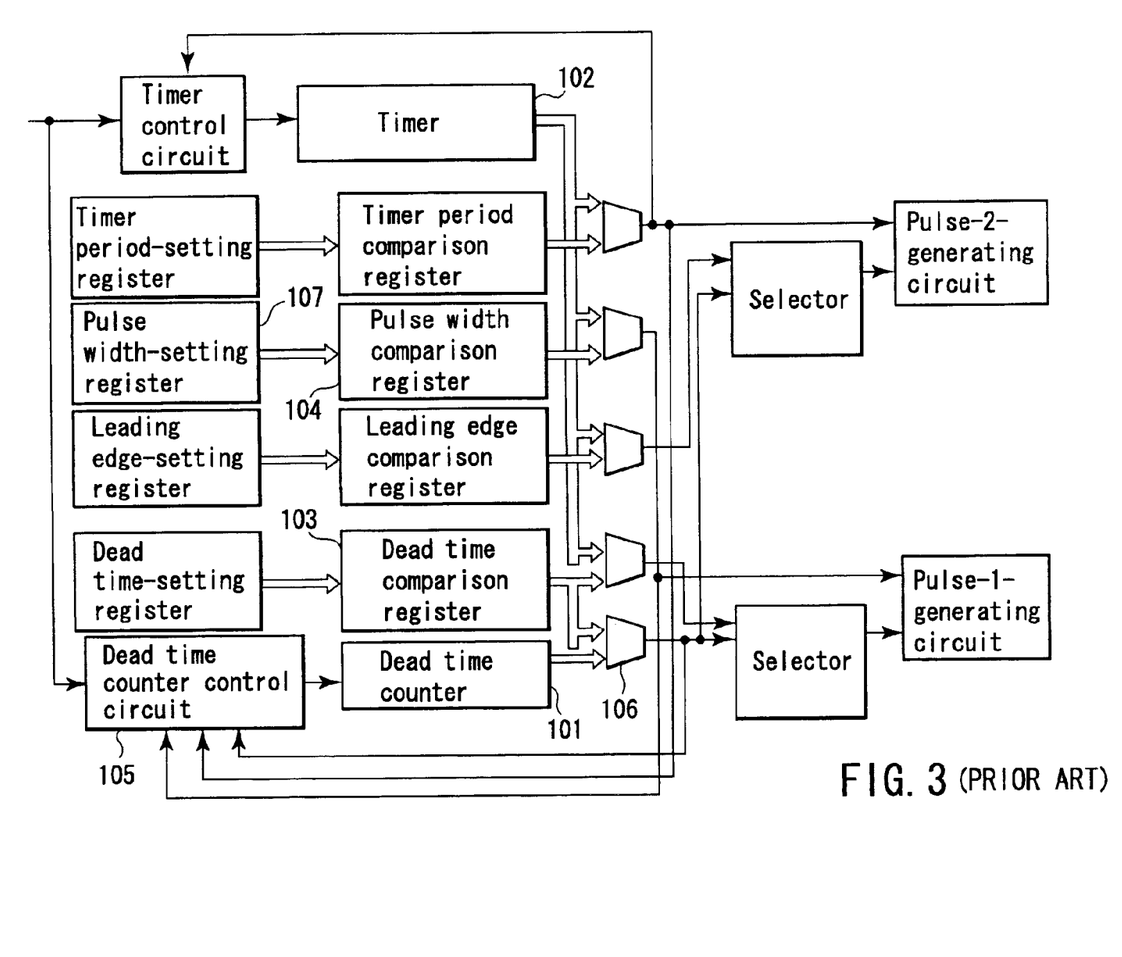
FIG. 3 is a block diagram illustrating another conventional waveform-generating circuit device.

Referring to FIGS. 1–3, a conventional waveform-generating circuit device will be described.

FIG. 1 is a block diagram illustrating a conventional waveform-generating circuit device.

The waveform-generating circuit device (conventional example 1) shown in FIG. 1 has a function for adding a dead time. This device measures a dead time using a dead time counter 101, and generates a waveform.

FIG. 2 is a timing chart useful in explaining waveforms with respective dead-time portions generated by the waveform-generating circuit device.

Firstly, a dead time counter 101 and time counter 102 are simultaneously started. When the value of the dead time counter 101 reaches the value registered in a dead time comparison register 103, a pulse 1 rises as shown in FIG. 2. At the same time, the dead time counter 101 stops counting. Subsequently, when the value of the time counter 102 reaches the value registered in a pulse width comparison register 104, the pulse 1 drops. At the same time, the dead time counter 101 is restarted.

When the value of the dead time counter 101 reaches the value registered in the dead time comparison register 103, a pulse 2 rises as shown in FIG. 2. Upon the falling of the pulse 2, the dead time counter 101 again stops counting. Thereafter, when the value of the time counter 102 reaches the value registered in a period comparison register 103, the pulse 2 drops. At the same time, the dead time counter 101 and time counter 102 are restarted. The above processing is repeated.

As stated above, the conventional waveform-generating circuit device requires two counters. Further, where two or more pulsed waveforms having a single period are generated, the degree of freedom in designing waveforms is low, which means that a variety of pulsed waveforms cannot be generated. To obtain a high degree of freedom in waveform control, the dead time counter 101, dead time control circuit 105 and comparator circuit 106 must be dedicated to dead time setting. As a result, the circuit scale is inevitably increased to that shown in FIG. 3 (conventional example 2).

Figure 11:
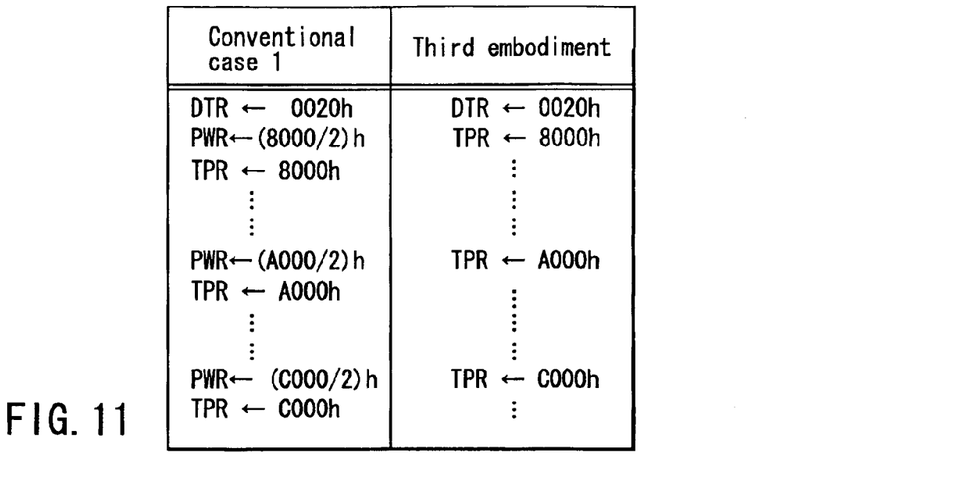
FIG. 11 is a table illustrating examples of instructions to be set in a register in the third embodiment and conventional case 1.

Furthermore, consideration will be given to the case where the period of a waveform is continuously varied with the duty ratio fixed at 50%. As illustrated in FIG. 11, the CPU of the conventional waveform-generating circuit device must compute the pulse width for every loop, and set a pulse width setting register 107 accordingly. Therefore, the CPU bears a heavy load and hence its response becomes low, which adversely affects the period changing operation of a high-speed time counter.

BRIEF SUMMARY OF THE INVENTION

According to an aspect of the invention, there is provided a semiconductor integrated circuit comprising:

a first storage circuit configured to store a first value used to set a dead time; a second storage circuit configured to store a second value used to set a pulse width; an adder circuit configured to add the first value stored in the first storage circuit and the second value stored in the second storage circuit, thereby outputting an addition result; a timer configured to measure an elapsed time and output a count value indicative of the elapsed time; a first comparator circuit configured to compare the count value output from the timer with the addition result output from the adder circuit; and a waveform-generating circuit configured to generate a pulse on the basis of a comparison result of the first comparator circuit.

DETAILED DESCRIPTION OF THE INVENTION

Semiconductor integrated circuits according to embodiments of the invention will be described with reference to the accompanying drawings. In the figures, like reference numerals denote like elements.

First Embodiment

Figure 4:
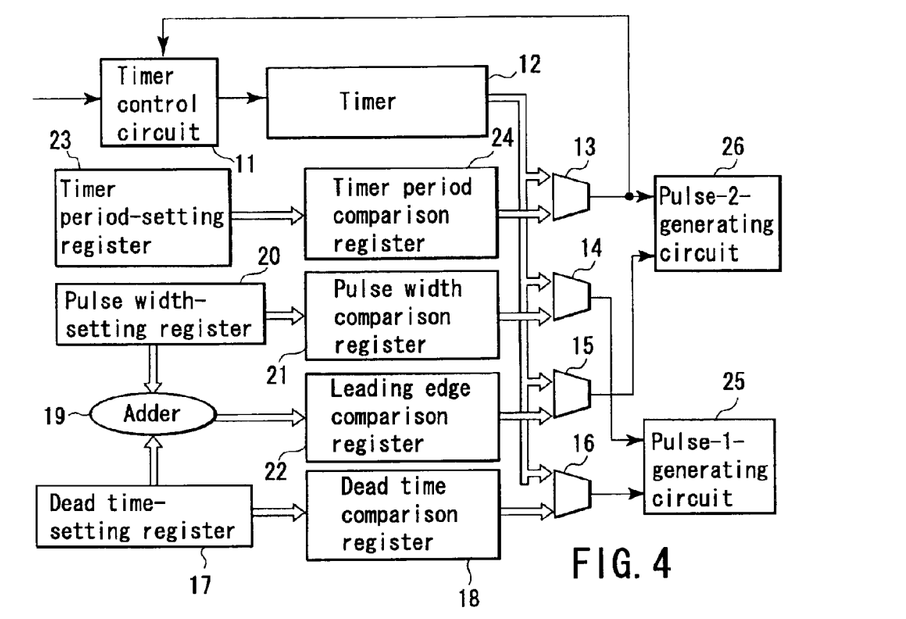
FIG. 4 is a block diagram illustrating the structure of a semiconductor integrated circuit according to a first embodiment of the invention.

A semiconductor integrated circuit according to a first embodiment will be described. FIG. 4 is a block diagram illustrating the structure of the semiconductor integrated circuit of the first embodiment.

As seen from FIG. 4, a timer control circuit 11 is connected to a timer 12. The output of the timer 12 is input to comparator circuits 13, 14, 15 and 16. The output of a dead time-setting register 17 is input to the comparator circuit 16 via a dead time comparison register 18. The output of the dead time-setting register 17 is input to an adder 19.

The output of a pulse width-setting register 20 is input to the comparator circuit 14 via a pulse width comparison register 21. The output of the pulse width-setting register 20 is also input to the adder 19. The output of the adder 19 is input to the comparator circuit 15 via a register 22 for comparing the leading edge of a pulse 2. The output of a timer period-setting register 23 is input to the comparator circuit 13 via a timer period comparison register 24.

The outputs of the comparator circuits 14 and 16 are input to a pulse-1-generating circuit 25. The outputs of the comparators 13 and 15 are input to a pulse-2-generating circuit 26. The output of the comparator circuit 13 is also input to the timer control circuit 11.

The operation of the semiconductor integrated circuit of the first embodiment will now be described.

Figure 5:
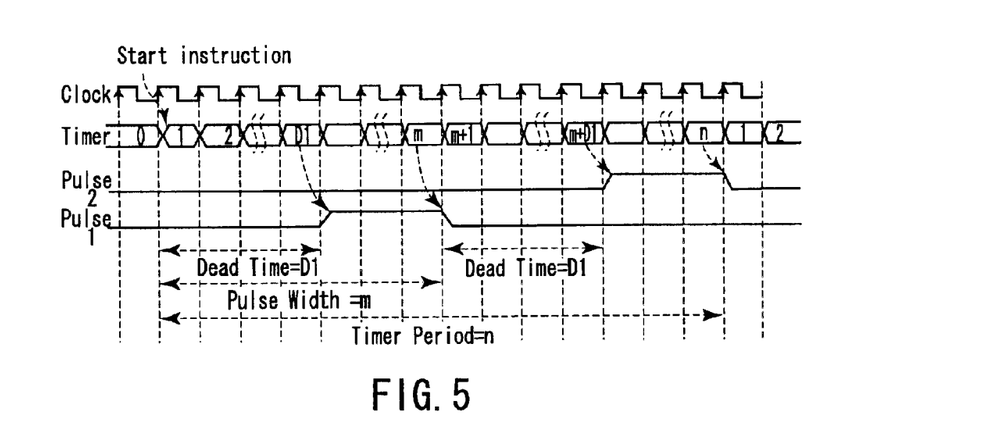
FIG. 5 is a timing chart useful in explaining examples of waveforms having respective dead time portions generated by the semiconductor integrated circuit of the first embodiment.

FIG. 5 is a timing chart useful in explaining examples of waveforms having respective dead time portions generated by the semiconductor integrated circuit.

Firstly, the timer control circuit 11 starts the timer 12 (start instruction). The timer 12 supplies the comparator circuit 16 with a timer value indicative of the time elapsed from the start of time measurement. The dead time-setting register 17 stores a dead time value indicative of a preset dead time, and outputs the dead time value to the dead time comparison register 18. The dead time comparison register 18 stores the dead time value and outputs it to the comparator circuit 16.

The comparator circuit 16 compares the timer value with the dead time value. If these values are identical, the circuit 16 outputs a value indicative of this fact to the pulse-1-generating circuit 25. Upon receiving this value, the pulse-1-generating circuit 25 raises a pulse signal 1 from a low level voltage (hereinafter referred to as "L") to a high level voltage (hereinafter referred to as "H"), as shown in FIG. 5.

Subsequently, the timer 12 supplies the comparator circuit 14 with a timer value indicative of the time elapsed from the start of time measurement. The pulse width-setting register 20 stores a pulse width value indicative of a preset pulse width, and outputs the pulse width value to the pulse width comparison register 21. The pulse width comparison register 21 stores the pulse width value and outputs it to the comparator circuit 14.

The comparator circuit 14 compares the timer value with the pulse width value. If these values are identical, the circuit 14 outputs a value indicative of this fact to the pulse-1-generating circuit 25. Upon receiving this value, the pulse-1-generating circuit 25 drops the pulse signal 1 from "H" to "L".

After that, the timer 12 supplies the comparator circuit 15 with a timer value indicative of the time elapsed from the start of time measurement. The dead time-setting register 17 outputs the dead time value to the adder 19. The pulse width-setting register 20 outputs the pulse width value to the adder 19. The adder 19 adds the received dead time value and pulse width value, and outputs the addition value to the pulse-2-leading-edge comparison register 22. The leading-edge comparison register 22 stores the addition value and outputs it to the comparator circuit 15.

The comparator circuit 15 compares the timer value with the addition value. If these values are identical, the circuit 15 outputs a value indicative of this fact to the pulse-2-generating circuit 26. Upon receiving this value, the pulse-2-generating circuit 26 raises a pulse signal 2 from "L" to "H".

Subsequently, the timer 12 supplies the comparator circuit 13 with a timer value indicative of the time elapsed from the start of time measurement. The timer period-setting register 23 stores a trailing edge value indicative of the preset trailing edge of the pulse 2 (timer period), and outputs the trailing edge value to the timer period comparison register 24. The timer period comparison register 24 stores the trailing edge value and outputs it to the comparator circuit 13.

The comparator circuit 13 compares the timer value with the trailing edge value. If these values are identical, the circuit 13 outputs a value indicative of this fact to the pulse-2-generating circuit 26. Upon receiving this value, the pulse-2-generating circuit 26 drops the pulse signal 2 from "H" to "L". The comparator circuit 13 also outputs the value indicative of the fact to the timer control circuit 11. Upon receiving this value, the timer control circuit 11 resets and restarts the timer 12. The semiconductor integrated circuit repeats the above-described processing.

As described above, in the first embodiment, the value registered in the dead time-setting register 17 and the value registered in the pulse width-setting register 20 are added together by the adder 19. The addition result of the adder 19 is transferred to the comparator circuit 15 via the pulse-2-leading-edge comparison register 22, where the addition result is compared with the value output from the timer 12 and used to define the leading edge of the pulse 2.

The above-described semiconductor integrated circuit does not require the dead time counter 101 for measuring a dead time and control circuit 105 for controlling the counter 101 employed in the waveform-generating circuit shown as the conventional example 1 in FIG. 1. Instead, the above integrated circuit additionally incorporates the adder 19, leading-edge comparison register 22 and comparator circuit 15. This structure can reduce the circuit scale and generate pulsed waveforms having dead time portions. In other words, in a semiconductor integrated circuit that generates a plurality of pulsed waveforms of a single period, the degree of freedom in designing pulsed waveforms can be enhanced without increasing the circuit scale.

Furthermore, as described above, the semiconductor integrated circuit of the embodiment additionally incorporates the pulse-2-leading-edge comparison register 22 and comparator circuit 15. As a result, the degree of freedom in designing a plurality of pulsed waveforms of a single period can be easily increased.

As described above, in the first embodiment, a value indicative of a dead time and a value indicative of a pulse width are added, and the addition result is used to define the leading edge of the pulse 2. As a result, the degree of freedom in generation of a plurality of pulsed waveforms of a single period can be increased even if the circuit scale is reduced.

Second Embodiment

Figure 6:
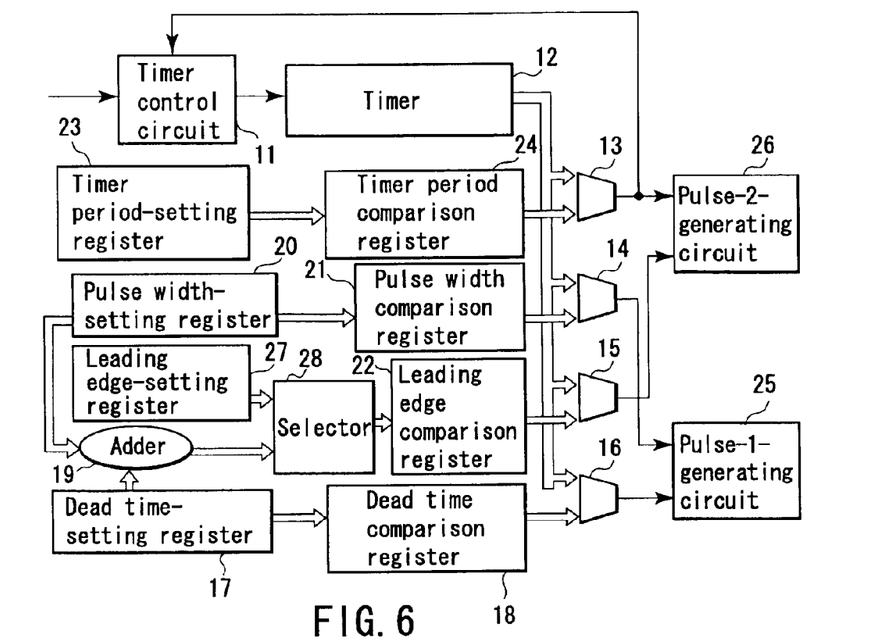
FIG. 6 is a block diagram illustrating the structure of a semiconductor integrated circuit according to a second embodiment of the invention.

A semiconductor integrated circuit according to a second embodiment will be described. FIG. 6 is a block diagram illustrating the structure of the semiconductor integrated circuit of the second embodiment.

The semiconductor integrated circuit of the second embodiment incorporates a leading edge-setting register 27 for setting the leading edge of the pulse 2, and a selector 28, in addition to the structural elements of the first embodiment shown in FIG. 4. The value transferred to the leading edge comparison register 22 is selected by the selector 28 on the basis of the value registered in the leading edge-setting register 27 and the addition result of the adder 19. In the second embodiment, elements similar to those in the first embodiment are denoted by corresponding reference numerals, and no description is given thereof.

As shown in FIG. 6, the selector 28 is interposed between the adder 19 and leading edge comparison register 22. The leading edge-setting register 27 for setting the leading edge of the pulse 2 is connected to the selector 28. The selector 28 selects either the output of the adder 19 or the output of the leading edge-setting register 27, and supplies the selected output to the leading edge comparison register 22.

The operation of the semiconductor integrated circuit according to the second embodiment will be described.

Figure 7:
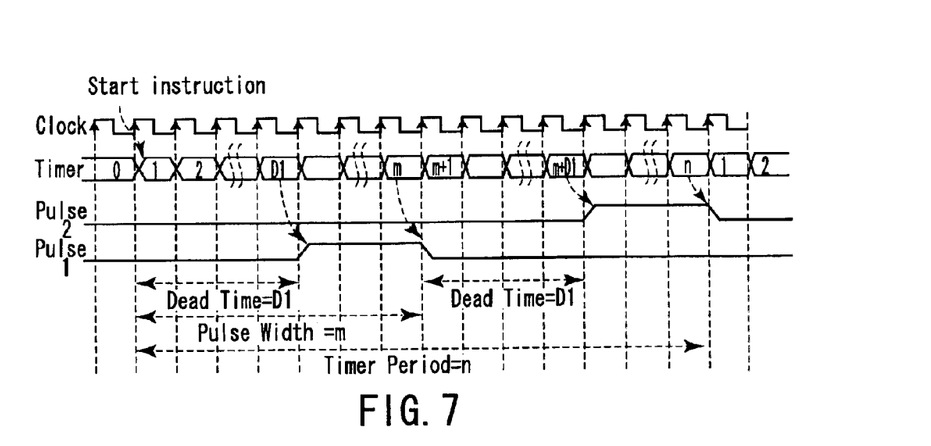
FIG. 7 is a timing chart useful in explaining examples of waveforms with respective dead time portions generated by the semiconductor integrated circuit of the second embodiment.
Figure 8:
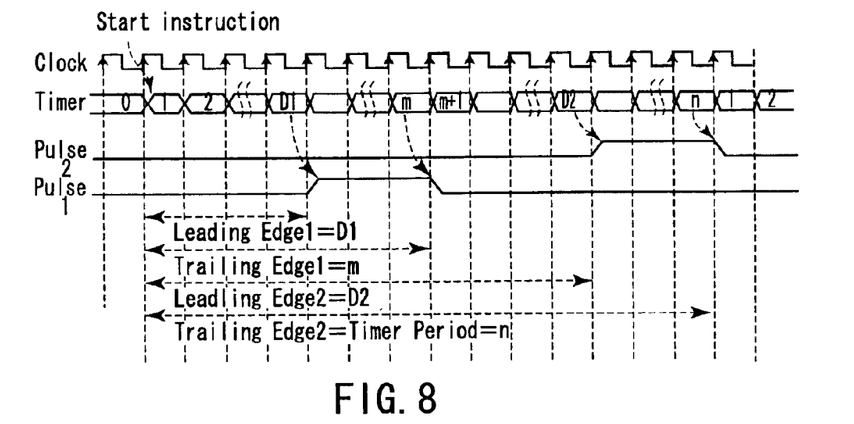
FIG. 8 is a timing chart useful in explaining examples of waveforms having no dead time portion generated by the semiconductor integrated circuit of the second embodiment.

FIGS. 7 and 8 show timing charts useful in explaining the generation of waveforms with dead time portions. FIG. 7 shows a case where the selector 28 has selected the output of the adder 19, and FIG. 8 a case where the selector 28 has selected the output of the leading edge-setting register 27. The leading edge of the pulse 2 is set as follows:

The timer 12 supplies the comparator circuit 15 with a timer value indicative of the time elapsed from the start of time measurement. The pulse width-setting register 17 outputs a dead time value to the adder 19. The pulse width-setting register 20 outputs a pulse width value to the adder 19. The adder 19 adds the received dead time value and pulse width value, and outputs the addition result to the selector 28.

The leading edge-setting register 27 stores a leading edge value indicative of the preset leading edge of the pulse 2, and outputs the leading edge value to the selector 28. The selector 28 selects either the addition result or leading edge value, and outputs the selected value to the leading edge comparison register 22 for the pulse 2. The leading edge comparison register 22 stores either the input addition result or leading edge value, and outputs it to the comparator circuit 15. The comparator circuit 15 compares either the addition result or leading edge value with the timer value. If these values are identical, the comparator circuit 15 outputs a value indicative of the identicalness to the pulse-2-generating circuit 26. Upon receiving this value, the pulse-2-generating circuit 26 raises the pulse signal 2 from "L" to "H". The other operations of the semiconductor integrated circuit of the second embodiment are similar to those of the circuit of the first embodiment.

As described above, in the second embodiment, the dead time value of the dead time-setting register 17 and the pulse width value of the pulse width-setting register 20 are added together by the adder 19, and the addition result is input to the selector 28. Further, the leading edge value of the leading edge-setting register 27 is input to the selector 28. Thereafter, the selector 28 selects either the input addition result or leading edge value, and transfers the selected value to the comparator circuit 15 via the leading edge comparison register 22 for the pulse 2. The comparator circuit 15 compares the transferred value with a value output from the timer 12, and uses the comparison result to define the leading edge of the pulse 2.

Thus, selective setting of the leading edge of the pulse 2 is enabled, thereby enhancing the degree of freedom in generation of two or more pulsed waveforms of a single period. Further, the circuit scale can be reduced, compared to the conventional case 2, shown in FIG. 3, in which the same function as in the second embodiment is realized.

As described above, in the second embodiment, either an addition value, which is obtained by adding a value indicative of a dead time to a value indicative of a pulse width using the adder 19, or a value stored in the register 27 and indicative of the leading edge of the pulse 2 is used to define the leading edge of the pulse 2. As a result, the degree of freedom in designing two or more pulsed waveforms of a single period can be enhanced.

Third Embodiment

Figure 9:
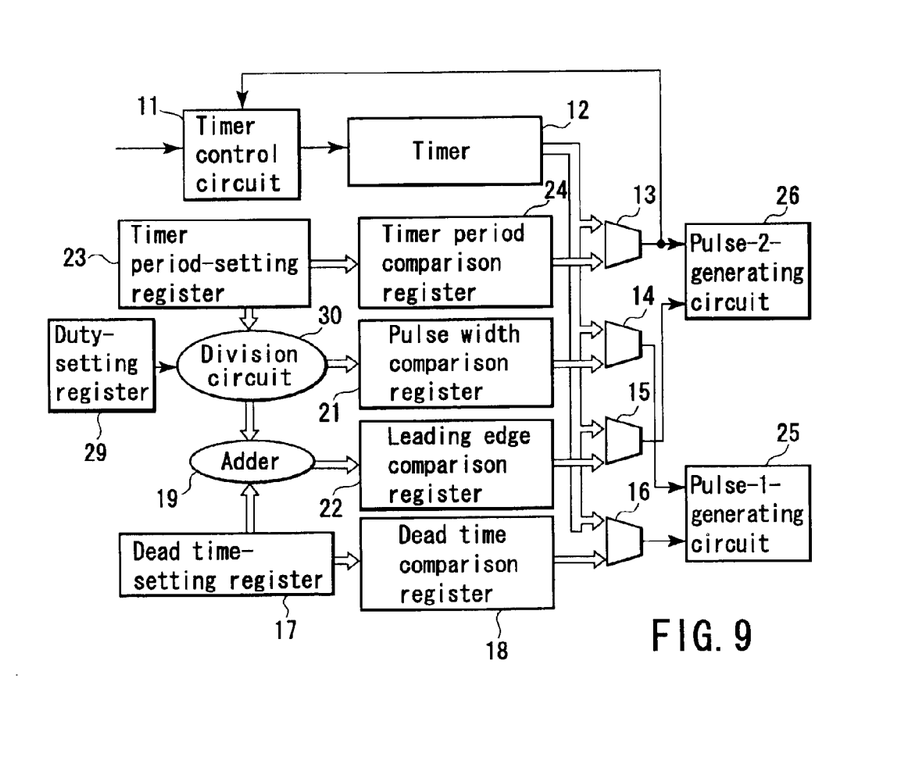
FIG. 9 is a block diagram illustrating the structure of a semiconductor integrated circuit according to a third embodiment of the invention.

A semiconductor integrated circuit according to a third embodiment will be described. FIG. 9 is a block diagram illustrating the structure of the semiconductor integrated circuit of the third embodiment.

The semiconductor integrated circuit of the third embodiment incorporates a duty-setting register 29 and division circuit 30, instead of the pulse width-setting register 20. The division circuit 30 holds a trailing edge value indicative of the trailing edge (timer period) of the pulse 2 registered in the timer period-setting register 23. The division circuit 30 computes a pulse width from the trailing edge value registered in the period-setting register 23 and the value registered in the duty-setting register 29. In the third embodiment, elements similar to those in the first embodiment are denoted by corresponding reference numerals, and no description is given thereof.

As seen from FIG. 9, the output of the duty-setting register 29 is input to the division circuit 30. The output of the timer period-setting register 23 is also input to the division circuit 30. The output of the division circuit 30 is input to the pulse width comparison register 21 and adder 19.

The operation of the semiconductor integrated circuit of the third embodiment will be described.

Figure 10:
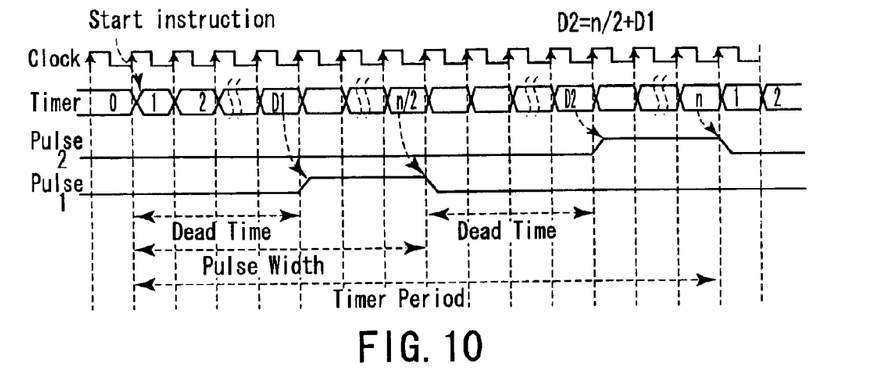
FIG. 10 is a timing chart useful in explaining examples of waveforms having respective dead time portions generated by the semiconductor integrated circuit of the third embodiment.

FIG. 10 is a timing chart useful in explaining waveforms having respective dead time portions generated by the third embodiment. The trailing edge of the pulse 1 is set as follows:

The timer 12 supplies the comparator circuit 14 with a timer value indicative of the time elapsed from the start of time measurement. The division circuit 30 holds a trailing edge value from the timer period-setting register 23 indicative of the trailing edge (timer period) of the pulse 2. The division circuit 30 divides the trailing edge value by the value registered in the duty-setting register 29, thereby obtaining a pulse width value indicative of a pulse width. The pulse width value is output to the pulse width comparison register 21.

The pulse width comparison register 21 stores the pulse width value and outputs it to the comparator circuit 14. The comparator circuit 14 compares the timer value with the pulse width value. If they are identical, the circuit 14 outputs a value indicative of this fact (identicalness) to the pulse-1-generating circuit 25. The pulse-1-generating circuit 25, in turn, falls the pulse signal 1 from "H" to "L".

Subsequently, the timer 12 supplies the comparator circuit 15 with a timer value indicative of the time elapsed from the start of time measurement. The dead time-setting register 17 outputs a dead time value to the adder 19. The division circuit 30 outputs the obtained pulse width value to the adder 19. The adder 19 adds the received dead time value and pulse width value, and outputs the addition value to the pulse-2-leading-edge comparison register 22.

The leading-edge comparison register 22 stores the addition value and outputs it to the comparator circuit 15. The comparator circuit 15 compares the timer value with the addition value. If these values are identical, the circuit 15 outputs a value indicative of this fact to the pulse-2-generating circuit 26. Upon receiving this value, the pulse-2-generating circuit 26 raises the pulse signal 2 from "L" to "H". The other operations of the semiconductor integrated circuit of the third embodiment are similar to those of the first embodiment.

As described above, in the third embodiment, the value registered in the timer period-setting register 23 and indicative of the timer period is divided by the set value of the duty-setting register 29, using the division circuit 30, and the division result is transferred to the comparator circuit 14. The comparator circuit 14 compares this value with the value output from the timer 12. The comparison result is used to define the trailing edge of the pulse 1.

In the semiconductor integrated circuit constructed as the above, the period of a waveform having a dead time portion can be varied with the duty ratio fixed, simply by changing the value set in the duty-setting register 29, as is shown in FIG. 11. As a result, the load on the CPU necessary for computing the pulse width of a waveform can be reduced. DTR, PWR and TPR in FIG. 11 represent the dead time-setting register, pulse width-setting register and timer period-setting register, respectively. In the examples shown in FIG. 11, the period is varied, as in: 8000h→A000h→C000h, with the duty ratio and dead time set at 50% and 20h, respectively.

As described above, in the third embodiment, the division circuit 30 divides the value registered in the timer period-setting register 23 and indicative of the timer period, by the set value of the duty-setting register 29, thereby obtaining a pulse width. This pulse width is used to define the trailing edge of the pulse 1, with the result that a pulsed waveform with a dead time portion, whose period is varied with its duty ratio fixed, can be generated. Further, the degree of freedom in generation of two or more pulsed waveforms of a single period can be enhanced without increasing the circuit scale.

Fourth Embodiment

Figure 12:
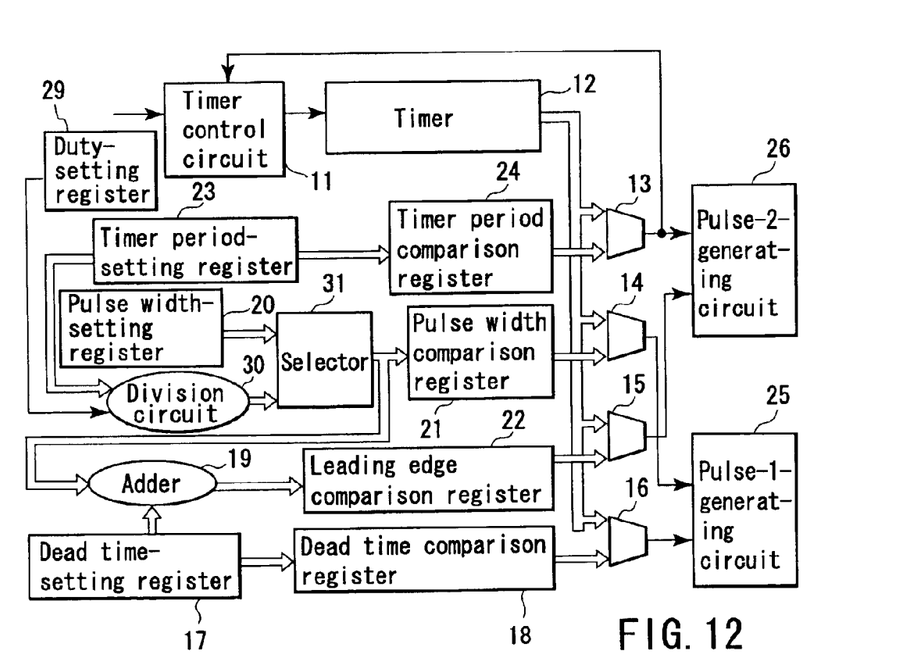
FIG. 12 is a block diagram illustrating the structure of a semiconductor integrated circuit according to a fourth embodiment of the invention.

A semiconductor integrated circuit according to a fourth embodiment will be described. FIG. 12 is a block diagram illustrating the structure of the semiconductor integrated circuit of the fourth embodiment.

The semiconductor integrated circuit of the fourth embodiment incorporates a selector 31 interposed between the pulse width-setting register 20 and pulse width comparison register 21, and the duty-setting register 29 and division circuit 30 (as employed in the third embodiment) connected to the selector 31, in addition to the structural elements employed in the first embodiment shown in FIG. 4. The trailing edge value (timer period) for the pulse 2 stored in the timer period-setting register 23 is input to the division circuit 30, and the output of the selector 31 is input to the adder 19. In the fourth embodiment, elements similar to those in the first embodiment are denoted by corresponding reference numerals, and no description is given thereof.

As shown in FIG. 12, the selector 31 is interposed between the pulse width-setting register 20 and pulse width comparison register 21. The output of the duty-setting register 29 is input to the division circuit 30, and the output of the division circuit 30 is input to the selector 31. The output of the selector 31 is input to the pulse width comparison register 21 and also to the adder 19. The output of the timer period-setting register 23 is input to the division circuit 30.

The operation of the semiconductor integrated circuit of the fourth embodiment will be described. The trailing edge of the pulse 1 and the leading edge of the pulse 2 are set as follows:

The timer 12 supplies the comparator circuit 14 with a timer value indicative of the time elapsed from the start of time measurement. The division circuit 30 holds a trailing edge value from the timer period-setting register 23 indicative of the trailing edge (timer period) of the pulse 2. The division circuit 30 divides the trailing edge value by the value registered in the duty-setting register 29, thereby obtaining a pulse width value indicative of a pulse width. The pulse width value is output to the selector 31. The pulse width-setting register 20 outputs a pulse width value to the selector 31.

The selector 31 selects either the pulse width value obtained by division or the pulse width value output from the register 20, and outputs the selection result to the pulse width comparison register 21. The pulse width comparison register 21 stores the selection result, and outputs it to the comparator circuit 14. If these values are identical, the comparator circuit 14 outputs a value indicative of the identicalness to the pulse-1-generating circuit 25. Upon receiving this value, the pulse-1-generating circuit 25 drops the pulse signal 1 from "H" to "L".

Subsequently, the timer 12 supplies the comparator circuit 15 with a timer value indicative of the time elapsed from the start of time measurement. The dead time-setting register 17 outputs a dead time value to the adder 19. The selector 31 outputs the selected value (the trailing edge value or pulse width value) to the adder 19. The adder 19 adds the received dead time value and selected value, and outputs the addition value to the pulse-2-leading-edge comparison register 22.

The leading edge comparison register 22 stores the addition value and outputs it to the comparator circuit 15. The comparator circuit 15 compares the timer value with the addition value. If these values are identical, the circuit 15 outputs a value indicative of this fact to the pulse-2-generating circuit 26. Upon receiving this value, the pulse-2-generating circuit 26 raises the pulse signal 2 from "L" to "H". The other operations of the semiconductor integrated circuit of the third embodiment are similar to those of the first embodiment.

As described above, in the fourth embodiment, the selector 31 selects either the pulse width value registered in the pulse width-setting register 20 or the division result of the division circuit 30, and outputs the selection result to the adder 19 and pulse width comparison register 21. Further, the adder 19 adds the dead time value registered in the dead time-setting register 17 and the output of the selector 31, and outputs the addition result to the pulse-2-leading-edge comparison register 22. As a result, the degree of freedom in designing two or more pulsed waveforms of a single period can be enhanced without increasing the circuit scale. In addition, the same advantage as that of the third embodiment can be obtained.

Fifth Embodiment

Figure 13:
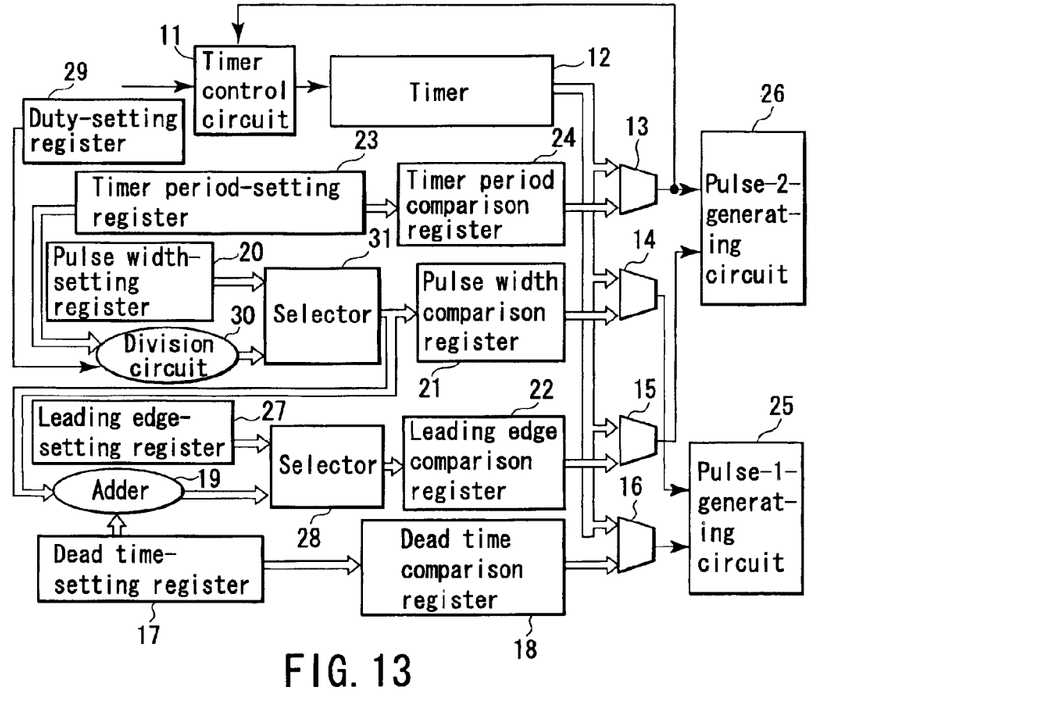
FIG. 13 is a block diagram illustrating the structure of a semiconductor integrated circuit according to a fifth embodiment of the invention.

A semiconductor integrated circuit according to a fifth embodiment will be described. FIG. 13 is a block diagram illustrating the structure of the semiconductor integrated circuit of the fifth embodiment.

The semiconductor integrated circuit of the fifth embodiment incorporates the leading edge-setting register 27 for setting the leading edge of the pulse 2, and the selector 28

(as employed in the second embodiment), in addition to the structural elements employed in the fourth embodiment shown in FIG. 12. The value transferred to the leading edge comparison register 22 is selected by the selector 28 on the basis of the value registered in the leading edge-setting register 27 and the addition result of the adder 19. In the fifth embodiment, elements similar to those in the fourth embodiment are denoted by corresponding reference numerals, and no description is given thereof.

As shown in FIG. 13, the selector 28 is interposed between the leading edge comparison register 22 and adder 19. The output of the leading edge-setting register 27 is input to the selector 28.

The operation of the semiconductor integrated circuit of the fifth embodiment will be described. The trailing edge of the pulse 1 and the leading edge of the pulse 2 are set as follows:

The timer 12 supplies the comparator circuit 14 with a timer value indicative of the time elapsed from the start of time measurement. The division circuit 30 holds a trailing edge value from the timer period-setting register 23 indicative of the trailing edge (timer period) of the pulse 2. The division circuit 30 divides the trailing edge value by the value registered in the duty-setting register 29, thereby obtaining a pulse width value indicative of a pulse width. The pulse width value is output to the selector 31. The pulse width-setting register 20 outputs a pulse width value to the selector 31.

The selector 31 selects either the pulse width value obtained by division or the pulse width value output from the register 20, and outputs the selection result to the pulse width comparison register 21. The pulse width comparison register 21 stores the selection result, and outputs it to the comparator circuit 14. If these values are identical, the comparator circuit 14 outputs a value indicative of the identicalness to the pulse-1-generating circuit 25. Upon receiving this value, the pulse-1-generating circuit 25 drops the pulse signal 1 from "H" to "L".

Subsequently, the timer 12 supplies the comparator circuit 15 with a timer value indicative of the time elapsed from the start of time measurement. The dead time-setting register 17 outputs a dead time value to the adder 19. The selector 31 outputs the selected value (the trailing edge value or pulse width value) to the adder 19. The adder 19 adds the received dead time value and selected value, and outputs the addition value to the selector 28. The leading edge-setting register 27 stores a leading edge value indicative of the preset leading edge of the pulse 2, and outputs the leading edge value to the selector 28. The selector 28 selects either the addition value or the leading edge value, and outputs the selected value to the leading edge comparison register 22.

The leading edge comparison register 22 stores either the input addition value or leading edge value, and outputs the stored value to the comparator circuit 15. The comparator circuit 15 compares the timer value with the stored value. If these values are identical, the circuit 15 outputs a value indicative of this fact to the pulse-2-generating circuit 26. Upon receiving this value, the pulse-2-generating circuit 26 raises the pulse signal 2 from "L" to "H". The other operations of the semiconductor integrated circuit of the third embodiment are similar to those of the fourth embodiment.

As described above, in the fifth embodiment, the selector 31 selects either the pulse width value registered in the pulse width-setting register 20 or the division result of the division circuit 30, and outputs the selection result to the adder 19 and pulse width comparison register 21. Further, the selector 28 selects either the value registered in the leading edge-setting register 27 or the addition value, and outputs the selected value to the pulse-2-leading edge comparison register 22. As a result, the degree of freedom in designing two or more pulsed waveforms of a single period can be increased without increasing the circuit scale.

Sixth Embodiment

Figure 14:
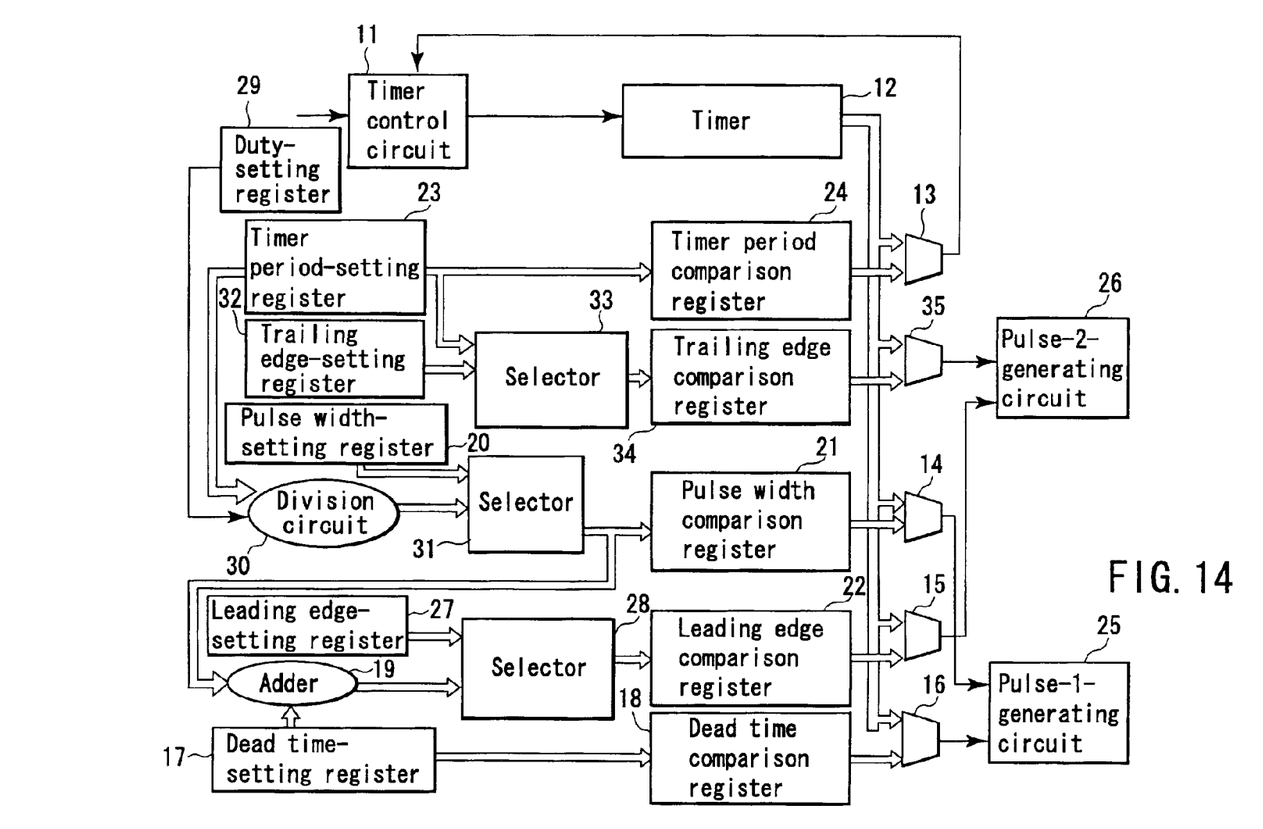
FIG. 14 is a block diagram illustrating the structure of a semiconductor integrated circuit according to a sixth embodiment of the invention.

A semiconductor integrated circuit according to a sixth embodiment will be described. FIG. 14 is a block diagram illustrating the structure of the semiconductor integrated circuit of the sixth embodiment.

The semiconductor integrated circuit of the sixth embodiment incorporates a trailing edge-setting register 32 for setting the trailing edge of the pulse 2, a selector 33, a trailing edge comparison register 34 and a comparator circuit 35, in addition to the structural elements employed in the fifth embodiment shown in FIG. 13. In the sixth embodiment, elements similar to those in the fifth embodiment are denoted by corresponding reference numerals, and no description is given thereof.

As shown in FIG. 14, the output of the trailing edge-setting selector 32 is input to the selector 33. Further, the output of the timer period-setting register 23 is input to the selector 33. The output of the selector 33 is input to the comparator circuit 35 via the trailing edge comparison register 34. The output of the comparator circuit 35 is input to the pulse-2-generating circuit 26.

The operation of the semiconductor integrated circuit of the sixth embodiment will now be described. The trailing edge of the pulse 2 is set as follows:

The timer 12 supplies the comparator circuit 35 with a timer value indicative of the time elapsed from the start of time measurement. The selector 33 holds a value from the timer period-setting register 23 indicative of a timer period. The selector 33 also holds a trailing edge value from the trailing edge-setting register 32 indicative of the trailing edge of the pulse 2.

The selector 33 selects either the value indicative of the timer period or the trailing edge value, and outputs the selected value to the trailing edge comparison register 34. The trailing edge comparison register 33 stores the selected value, and outputs it to the comparator circuit 35. If these values are identical, the comparator circuit 35 outputs a value indicative of the identicalness to the pulse-2-generating circuit 26. Upon receiving this value, the pulse-2-generating circuit 26 drops the pulse signal 2 from "H" to "L".

Subsequently, the timer 12 supplies the comparator circuit 13 with a timer value indicative of the time elapsed from the start of time measurement. The timer period-setting register 23 outputs a value indicative of a timer period to the timer period comparison register 24. The timer period comparison register 24 stores the value indicative of the timer period and outputs this value to the comparator circuit 13. The comparator circuit 13 compares this value with the timer value. If these values are identical, the comparator circuit 13 supplies the timer control circuit 11 with a value indicative of the identicalness. The timer control circuit 11, in turn, resets and restarts the timer 12.

In the sixth embodiment, the circuits 23, 24 and 13 used to set a timer period are arranged in line, while the circuits 32, 34 and 35 used to define the trailing edge of the pulse 2 are also arranged in line. This structure enhances the degree of freedom in generation of pulsed waveforms.

Further, the six embodiment employs the selector 33 that is used to select whether the trailing edge value for the pulse 2 registered in the trailing edge-setting register 32, or the value in the timer period-setting register 23 indicative of a timer period should be transferred to the trailing edge comparison register 34. This structure enables a pulsed waveform to be generated programmably with respect to a timer period, thereby enhancing the degree of freedom in designing two or more pulsed waveforms of a single period, without increasing the circuit scale.

In the above-described embodiments of the invention, a dead time counter used in a conventional case is not needed, but a waveform with a dead time portion can be generated using a single counter and the same number of instructions as used in the conventional case. Furthermore, a mode for generating a number of waveforms can be added simply by adding a small-scale circuit, compared to the conventional counter that generates a plurality of waveforms of a single period having respective dead time portions.

The third to sixth embodiments incorporate an operating circuit for computing a pulse width. The number of occasions of setting waveform comparison data in response to instructions can be reduced when the computation result of the operating circuit is used as the waveform comparison data. As a result, the load on the CPU that issues the instructions can be reduced. For example, if the structure employed in each embodiment is applied to a waveform output circuit that needs to operate at high speed to change the period of a waveform with the duty ratio fixed, the response speed of the CPU when the period of waveform generation is varied can be increased.

As described above, the embodiments of the invention can provide a semiconductor integrated circuit of a relatively small circuit scale, which shows a high degree of freedom in generation of pulsed waveforms, and in which the CPU does not bear a heavy load even during a waveform-period varying operation, therefore shows a high-speed response.

The above-described embodiments can be combined appropriately. Further, each embodiment contains inventions of various stages, and each invention can be extracted therefrom by appropriately combining some of the structural elements incorporated therein.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit comprising:
   a first value storage unit configured to store a first value used to set a dead time;
   a second storage circuit configured to store a second value used to set a pulse width;
   an adder circuit configured to add the first value stored in the first storage circuit and the second value stored in the second storage circuit, thereby outputting an addition result;
   a timer configured to measure an elapsed time and output a count value indicative of the elapsed time;
   a first comparator circuit configured to compare the count value output from the timer with the addition result output from the adder circuit; and
   a waveform-generating circuit configured to generate a pulse on the basis of a comparison result of the first comparator circuit,
   wherein the waveform-generating circuit defines a leading edge of the pulse when the first comparator circuit confirms that the count value is identical to the addition result.

2. The semiconductor integrated circuit according to claim 1, further comprising:
   a third storage circuit configured to store a set value used to set a counting period of the timer; and
   a second comparator circuit configured to compare the set value stored in the third storage circuit with the count value output from the timer,
   and wherein the waveform-generating circuit defines a trailing edge of the pulse when the second comparator circuit confirms that the count value is identical to the set value.

3. The semiconductor integrated circuit according to clam 2, further comprising a control circuit configured to control the count value of the timer, and wherein the control circuit resets the count value of the timer to restart the timer when the second comparator circuit confirms that the count value is identical to the set value.

4. A semiconductor integrated circuit comprising:
   a first storage circuit configured to store a first value used to set a dead time;
   a second storage circuit configured to store a second value used to set a pulse width;
   an adder circuit configured to add the first value stored in the first storage circuit and the second value stored in the second storage circuit, thereby outputting an addition result;
   a third storage circuit configured to store a leading edge value used to define a leading edge of a pulse;
   a selection circuit configured to select one of the addition result of the adder circuit and the leading edge value stored in the third storage circuit;
   a timer configured to measure an elapsed time and output a count value indicative of the elapsed time;
   a first comparator circuit configured to compare the count value output from the timer with one of the addition result and the leading edge value selected by the selection circuit; and
   a waveform-generating circuit configured to generate the pulse on the basis of a comparison result of the first comparator circuit.

5. The semiconductor integrated circuit according to claim 4, wherein the waveform-generating circuit defines the leading edge of the pulse when the first comparator circuit confirms that the count value is identical to one of the addition result and the leading edge value.

6. The semiconductor integrated circuit according to claim 5, further comprising:
   a fourth storage circuit configured to store a set value used to set a counting period of the timer; and
   a second comparator circuit configured to compare the set value stored in the third storage circuit with the count value output from the timer,
   and wherein the waveform-generating circuit defines a trailing edge of the pulse when the second comparator circuit confirms that the count value is identical to the set value.

7. The semiconductor integrated circuit according to claim 6, further comprising a control circuit configured to control the count value of the timer, and wherein the control circuit resets the count value of the timer to restart the timer when the second comparator circuit confirms that the count value is identical to the set value.

8. A semiconductor integrated circuit comprising:
   a timer configured to measure an elapsed time and output a count value indicative of the elapsed time;

a first storage circuit configured to store a first set value used to set a counting period of the timer;

a second storage circuit configured to store a second set value used to set a pulse width of a first pulse;

an operating circuit configured to compute a value indicative of the pulse width on the basis of the first set value stored in the first storage circuit and the second set value stored in the second storage circuit;

a first comparator circuit configured to compare the count value output from the timer with the value indicative of the pulse width and computed by the operating circuit; and a first waveform-generating circuit configured to generate the first pulse on the basis of a comparison result of the first comparator circuit, wherein the first waveform-generating circuit defines a trailing edge of the first pulse when the first comparator circuit confirms that the count value output from the timer is identical to the value indicative of the pulse width.

9. A semiconductor integrated circuit comprising:

a timer configured to measure an elapsed time and output a count value indicative of the elapsed time;

a first storage circuit configured to store a first set value used to set a counting period of the timer;

a second storage circuit configured to store a second set value used to set a pulse width of a first pulse;

an operating circuit configured to compute a value indicative of the pulse width on the basis of the first set value stored in the first storage circuit and the second set value stored in the second storage circuit;

a first comparator circuit configured to compare the count value output from the timer with the value indicative of the pulse width and computed by the operating circuit;

a first waveform-generating circuit configured to generate the first pulse on the basis of a comparison result of the first comparator circuit;

a third storage circuit configured to store a value used to set a dead time;

an adder circuit configured to add the value indicative of the pulse width and computed by the operating circuit, to the value used to set the dead time and stored in the third storage circuit, thereby outputting an addition result;

a second comparator circuit configured to compare the count value output from the timer with the addition result of the adder circuit; and a second waveform-generating circuit configured to generate a second pulse on the basis of a comparison result of the second comparator circuit, wherein the second waveform-generating circuit defines the leading edge of the second pulse when the second comparator circuit confirms that the count value output from the timer is identical to the addition result.

10. The semiconductor integrated circuit according to claim 9, further comprising:

a third comparator circuit configured to compare the first set value stored in the first storage circuit with the count value output from the timer, and wherein the second waveform-generating circuit defines a trailing edge of the second pulse when the third comparator circuit confirms that the count value is identical to the first set value.

11. The semiconductor integrated circuit according to claim 10, further comprising a control circuit configured to control the count value of the timer, and wherein the control circuit resets the count value of the timer to restart the timer when the third comparator circuit confirms that the count value is identical to the first set value.

* * * * *